Sept. 24, 1957 F. C. WILLIAMS ET AL 2,807,749

APPARATUS FOR THE ELECTRICAL STORAGE OF DIGITAL INFORMATION

Filed Aug. 11, 1952 2 Sheets-Sheet 1

INVENTORS:
F. C. WILLIAMS
T. KILBURN
ATTORNEYS:

Sept. 24, 1957 F. C. WILLIAMS ET AL 2,807,749

APPARATUS FOR THE ELECTRICAL STORAGE OF DIGITAL INFORMATION

Filed Aug. 11, 1952 2 Sheets-Sheet 2

Inventors:
F. C. Williams
T. Kilburn
Attorneys:
Moore & Hall 2,807,749

APPARATUS FOR THE ELECTRICAL STORAGE OF DIGITAL INFORMATION

Frederic Calland Williams, Timperley, and Tom Kilburn, Davyhulme, Manchester, England, assignors to National Research Development Corporation, London, England Application August 11, 1952, Serial No. 303,804

Claims priority, application Great Britain August 15, 1951

7 Claims. (Cl. 315—20)

The present invention is an improvement in or modification of the invention claimed in our copending patent application Ser. No. 50,136, filed September 20, 1948, and relates to apparatus for the electrical storage of digital information, suitable for use for example in digital computers, and of the type comprising a cathode ray tube having an electrostatic charge-retaining recording surface on elemental areas of which information is stored in the form of different states of charge produced by secondary emission from the elemental areas when bombarded by the cathode ray beam.

In the specification above referred to and in that of our copending patent application Ser. No. 124,192, filed October 28, 1949, and also in a paper entitled "A storage system for use with binary-digital computing machines" by F. C. Williams and T. Kilburn, published in the "Proceedings of the Institution of Electrical Engineers," part III, No. 40, March 1949, at pages 81–100, there is described a method of storage known as the "defocus-focus" method. In this method the cathode ray beam is held stationary for the duration of a digit interval (the time allotted to the storage of a digit) when directed upon an elemental area upon which information is to be stored. If one digit, say "0," is to be stored the beam is switched on when directed in a defocussed condition upon the elemental area and is then switched off and maintained switched off for the rest of the digit interval. If another digit, say "1" is to be stored, the beam is switched on in a defocussed condition when directed upon the elemental area during the first part of the digit interval and is then sharply focussed before it is switched off at the end of the digit interval.

The effect of this bombardment of a central region of the elemental area by the sharply focussed beam is to eject secondary electrons which pass to the outer parts of the area and reduce the positive charge on the outer parts.

The effect has been referred to as the excavation of a "well" of positive charge with the defocussed beam and the partial re-filling of the "well" (re-filling the outer parts) by the central bombardment with a focussed beam.

It will be noted that whether a "0" or a "1" is to be stored, the beam is switched on to the elemental area in a defocussed condition. In a subsequent exploration of the elemental area, this switching-on gives rise, in a signal plate capacitively coupled to the recording surface, to a signal which is characteristic of the information stored. If a "0" was stored, substantially no change is produced in the charge on the area, assuming that no leakage of charge has occurred, because the "well" was already fully excavated. The signal generated is then a negative pulse due to the introduction into the neighbourhood of the area of a cloud of electrons from the beam. If a "1" was stored the reduced positive charge on the outer parts of the area is increased (partial re-excavation of the "well") thus giving rise to a positive signal.

As described in the previously-mentioned prior specifications and Paper, these signals serve not only to enable the stored information to be read but also to regenerate the stored information. For regeneration, the signals are applied to determine whether the bombardment with a sharply focussed beam during the later part of the digit interval is to be performed or not.

It will be assumed for convenience of description that the two kinds of bombardment, namely defocussed only or defocussed followed by focussed, corresponding respectively to "0" and "1," although it will be obvious that the choice is arbitrary.

When a storage device of this kind is used in digital computing apparatus, and no doubt in other cases also, it is sometimes required to regenerate the information stored and at other times it is required to change the information stored as a result of writing new information from an external source or as a result of "instructions" received from the computing apparatus which require a change to be made.

An imperfection has been observed when converting a "1" to a "0." It has been found that when a charge pattern corresponding to "1" is bombarded once by a defocussed beam the charge pattern produced does not correspond exactly to that of a "0"; the "well" has not been fully re-excavated. Two or more successive bombardments with a defocussed spot have been found necessary in order to produce full excavation and thus to obtain the required charge pattern. The result of this is that when an elemental area whose charge has been changed from that corresponding to a "1" to that corresponding to a "0" is next bombarded by a defocussed beam, the initial signal obtained is not purely a negative-going cloud pulse but contains a positive-going signal due to further excavation. This may lead to the regeneration of a "1" instead of a "0."

It is the principal object of this invention to overcome or at least greatly reduce this disadvantage.

According to the present invention, there is provided a method of electrically storing digital information, using apparatus of the type specified, comprising storing a first digit on the recording surface by bombardment of an elemental area of the surface with a defocussed beam whilst the beam is held substantially stationary, storing a second digit, of different significance from the first, by first bombarding an elemental area of the surface with a defocussed beam, and subsequently bombarding the surface with a more sharply focussed beam which is moved a short distance to a point outside the elemental area, and again directing the beam upon the elemental areas in a defocussed state in order to generate in a pick-up electrode capacitively coupled to the said surface voltages representative of the state of charge on the areas. By a short distance is meant a distance from which secondary electrons can reach the elemental area and produce a substantial change in the charge on the area. The path traced by the more sharply focussed beam may extend from the centre of the area bombarded by the defocussed beam to just beyond one edge of this area.

The effect of moving the focussed beam in this way is to provide a small "well" of positive charge outside the area bombarded by the defocussed beam and the re-filling or partial re-filling of this small "well" contributes a negative-going signal component which can be arranged substantially to counterbalance the positive-going signal component arising from the further excavation of the incompletely excavated "well" on the elemental area.

The movement of the beam whilst focussed may be in any direction.

The invention will be described by way of example with reference to the accompanying drawings in which.

Figure 1:
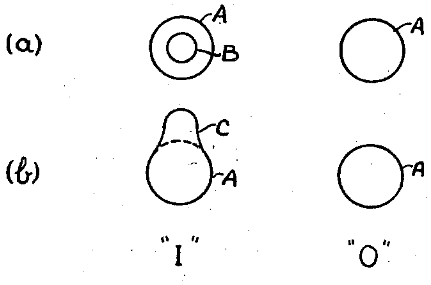
Fig. 1 is an explanatory diagram.

Referring to Fig. 1, there is represented on the left the areas (much enlarged) that may be bombarded to record "1." First the beam is directed in a defocussed state on to the outer area A and subsequently it is focussed more sharply and directed upon the inner area B. The effect of this later bombardment is to release secondary electrons which at least partly re-fill the "well" of positive charge in the annular area between A and B so that this annular area is rendered less positive than it was after bombardment by the defocussed beam. The area A on the right is that bombarded to record "0," the beam being switched off before it becomes more sharply focussed. The effect is to leave the area positively charged.

In carrying out the present invention, as shown in Fig. 1(*b*), in order to record "1" the area A is first bombarded as before and subsequently the beam is more sharply focussed and is moved to a point C outside the area A, as shown on the left. Secondary electrons from C then pass to A, partially re-filling the "well" of positive charge whilst a "well" of positive charge is left at C. In order to record "0" the area A is bombarded with the defocussed beam, as shown on the right, and the beam is switched off before it is more sharpy focussed.

Figure 3:
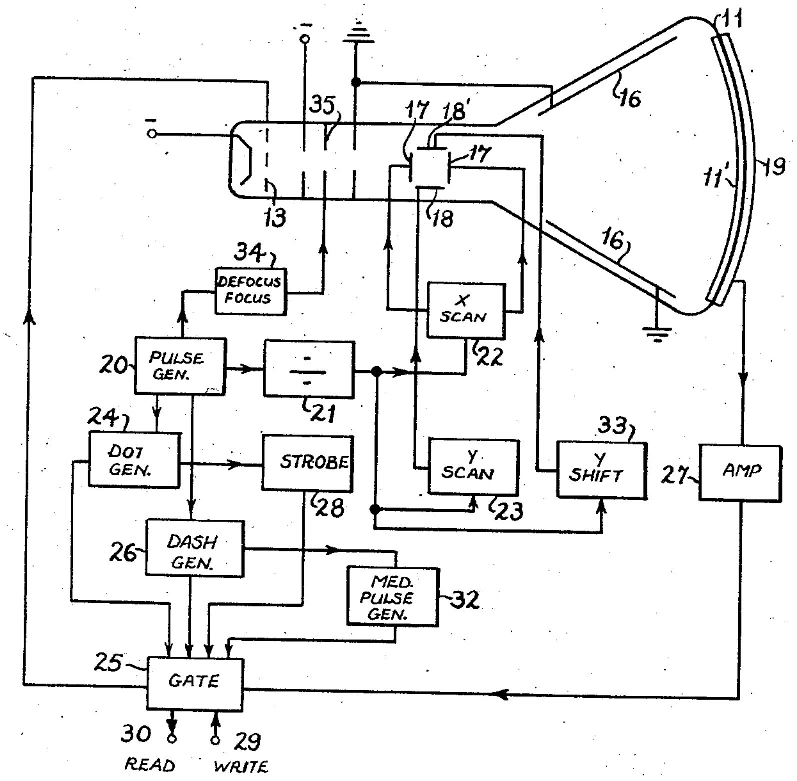
Fig. 3 is a block circuit diagram of one embodiment of the invention.

Referring now to Fig. 3, this shows a block circuit diagram which is only slightly modified from what is shown in the specification of our copending Patent Application Ser. No. 165,262, filed May 31, 1950, and which is now U. S. Patent No. 2,769,935, granted November 6, 1956, reference to that specification should be made for further details of the circuit.

In Fig. 3 there is shown a cathode ray tube 11 having within its envelope an electrostatic charge-retaining surface 11', which may be the normal coating of fluorescent material, and outside the envelope and capacitively coupled to the surface 11' a pick-up electrode 19. Within the envelope there are the usual beam forming, controlling and deflecting electrodes including a control grid 13, a final anode 16 which may be a conducting coating on the tube envelope, and deflecting plates 17, 18, 18'.

A pulse generator 20 generates pulses to control the generation of the various waveforms required. Pulses from 20 are applied to a frequency divider 21 which generates pulses to control an X scan generator 22, a Y scan generator 23 and a Y shift generator 33. Pulses from 20 also control a dot pulse generator 24, which in turn controls a strobe pulse generator 28, and a dash pulse generator 26 which in turn controls a meditation pulse generator 32. The gate circuit 25 may be constituted as described in the earlier specification last above referred to.

Figure 2:
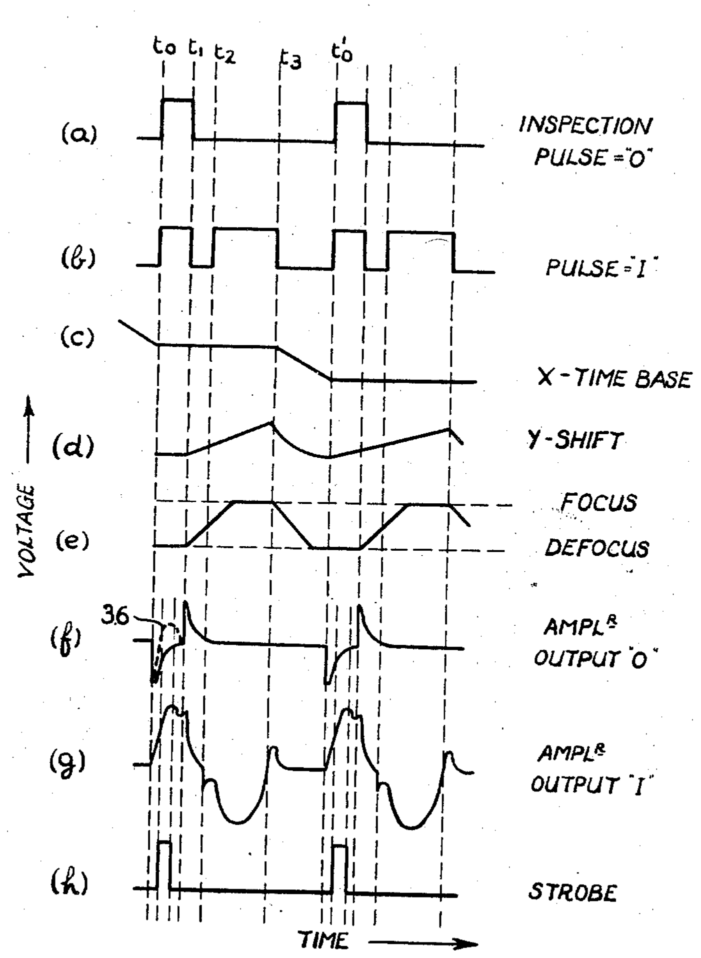
Fig. 2 shows waveforms that may be employed in carrying out the invention.

The operation of the circuit of Fig. 3 will be described with reference to Fig. 2. In Fig. 2 a digit interval, that is the time alotted to the storage of one digit is shown as the interval $t_0$ to $t'_0$. At (*a*) is shown the waveform generated by the dot generator 24; these pulses may appropriately be termed inspection pulses, since it is these pulses that switch the cathode ray beam on at the beginning of each digit interval when the state of charge on the area on which the beam is directed is inspected. The gate circuit 25 is so constituted that normally the beam is switched on by the positive pulses of Fig. 2(*a*) applied to the control grid 13. The beam is deflected in the X co-ordinate by the waveform of Fig. 2(*c*) applied to the plates 17 from the X-scan generator 22. Thus during the earlier part of each digit interval, from $t_0$ to $t_3$, the beam is at rest in the X or live direction. A suitable waveform, not shown, is applied from 23 to the deflecting plate 18 in order to cause the beam to scan the surface 11' in a raster of lines.

The pulse generator 20 controls a defocus-focus generator 34 which generates a waveform as shown in Fig. 2(*e*) and applies this to a focus-control electrode 35 of the tube. It is arranged that when the waveform is at its minimum the beam is defocussed while when it is at its maximum the beam is focused. During the interval $t_0$ to $t_1$ when the beam is switched on by an inspection pulse (Fig. 2(*a*)) the beam is defocussed and produces a spot as on the right in Fig. 1 corresponding to "0." While the waveform of Fig. 2(*a*) is used to control the switching of the beam the circuit will record the digit "0," since the beam becomes focussed only after $t_1$ when it is switched off.

When it is desired to write a "1," a suitable voltage is applied to the "write" terminal 29 of the gate circuit 25 and the gate then serves to extend the time during which the beam is switched on by applying dash pulses from 26 to the control grid 13. For reasons given in specification Ser. No. 165,262 already referred to, a "meditation" pulse is applied from 32 to the gate circuit 25 and has the effect of switching the beam off between $t_1$ and $t_2$. The switching waveform thus has the form shown in Fig. 2(*b*). When the beam is switched on at $t_2$ after the "meditation" interval the beam is in the focussed condition. In one example the duration of the inspection pulse, that is the interval $t_0$ to $t_1$ is about 1.8 microseconds and the "meditation" interval $t_1$ to $t_2$ is about 1.2 microseconds.

A Y-shift generator 33, controlled from the pulse generator 20, applies a waveform such as is shown in Fig. 2(*d*) to the deflecting plate 18'. It will be seen that this has the effect of deflecting the beam a small amount in the Y co-ordinate during the interval $t_1$ to after $t_3$, that is while the beam is being focussed and is in the fully focussed state. The effect is to cause the beam to move from A in Fig. 1(*b*) to C. As already stated the shift may be in any desired direction, for instance in the X co-ordinate if preferred.

Assuming that "0" has been recorded at a given region on the recording surface, when the beam is next switched on to this region by the waveform of Fig. 2(*a*) there will be generated in the pick-up electrode 11' a voltage such as shown in full lines in Fig. 2(*f*). If, on the other hand, the region contains a "1," the voltage will have a form such as that shown in Fig. 2(*g*). A strobe pulse of Fig. 2(*h*) is applied from 28 to the gate circuit 25 and serves to select from the voltages the part occurring during the short duration of the strobe pulse. When a "0" is read the voltage selected will be (in the example shown) slightly negative, whereas when a "1" is read the voltage selected will be strongly positive.

When the apparatus is required to regenerate the stored information the voltage selected by the strobe pulse is used to control the gate circuit 25 in such a manner that when this voltage is about zero or negative no effect is produced and the beam remains switched off by the waveform of Fig. 2(*a*) after the time $t_1$ until the end of the digit interval. If, however, the voltage applied to the gate circuit from the pick-up electrode is positive, as when a "1" is read, the waveform of Fig. 2(*b*) is applied and the beam is switched on again at $t_2$; partial refilling of the positive "well" at A on the left in Fig. 1(b) takes place.

The effect already referred to which the present invention seeks to correct can be clearly understood from Fig. 2(*f*). If a given region is bombarded with the beam first defocussed and then focussed but not simultaneously deflected, as represented on the left in Fig. 1(*a*), and if in order to convert the "1" so recorded into a "0," the beam is next switched on to bombard the region in a defocussed state by a pulse as in Fig. 2(*a*) and is switched off before being focussed, when the region is next inspected by a pulse of Fig. 2 (*a*) there may be produced a waveform somewhat as indicated in broken lines at 36 in Fig. 2(*f*). The strobe pulse then selects a voltage which is substantially positive and the discrimination between the voltage selected when reading a "0" and a "1" is much reduced. The effect of refilling the small "well" at C in Fig. 1(*b*) is to contribute a negative component which may be arranged substantially to cancel the positive component which is shown in broken lines.

It will be noted that the waveform of Fig. 2(*e*) is not rectangular, as has hitherto been usual, but it is such that it serves to change from the defocussed to the focussed condition gradually. One reason for this is that it has been found that at regions near the edge of the raster the focussed spot has tended to be considerably displaced from the centre of the defocussed spot so that "filling" of the remoter parts of the "well" tended to be less effective than if the focussed spot were central. With the gradual change from the defocussed to the focussed condition opportunity is given for "filling" around the spot as it contracts and accurate centering is less important. It has also been found that with the more gradual change slightly less time is required for "filling."

We claim:

1. A method of storing digital information using a cathode ray tube having within its evacuated envelope an electrical charge-retaining recording surface, comprising storing a first digit on said surface by bombarding a first elemental area of said surface with the cathode ray beam in a defocussed state, storing a second digit, of different significance from said first digit, by first bombarding a second elemental area of said surface with the cathode ray beam in a defocussed state and subsequently bombarding a point on said surface outside said second elemental area with the cathode ray beam in a more sharply focussed state.

2. Apparatus for storing digital information comprising a cathode ray tube, means for producing a cathode ray beam in said tube, an electric charge-retaining surface within the evacuated envelope of said tube, means to direct said cathode ray beam of said tube successively to selected elemental areas of said surface during successive time intervals, means for varying the degree of focus of said beam during one of said intervals, means for switching said beam on and off during said one interval, and means for deflecting said beam during said one interval.

3. Apparatus for storing digital information comprising a cathode ray tube, means for producing a cathode ray beam in said tube, an electric charge-retaining surface within the evacuated envelope of said tube, means to direct said cathode ray beam of said tube successively to selected elemental areas of said surface during successive time intervals, means for varying the degree of focus of said beam during one of said intervals, a first switching means for switching said beam on during an initial part of said one interval and off for a later part of said one interval, a second switching means for switching said beam on for an initial and a later part of said one interval and off for the remainder of said one interval, means for deflecting said beam between said initial and later parts of said one interval, and circuit means responsive to information to be stored to selectively render one of said switching means operative.

4. Apparatus according to claim 3, comprising a pick-up electrode capacitively coupled to said surface and means to apply voltage from said pick-up electrode to said responsive means to select the one of said switching means that is rendered operative.

5. Apparatus according to claim 2, wherein said means to direct said cathode ray beam comprise a scanning generator generating a stepped electrical waveform having portions of substantially constant valve extending over at least a large part of each said time interval interspersed with portions of progresively varying value, a beam deflecting member adjacent said beam, and means coupling said scanning generator to said beam deflecting member.

6. Apparatus according to claim 2, wherein said means for varying the degree of focus of said beam comprise a beam focus control electrode, a fluctuating wave generator, and means coupling said generator to said electrode.

7. A method of storing digital information using a cathode ray tube having within its evacuated envelope an electrical charge-retaining recording surface, comprising storing a first digit on said surface by bombarding a first elemental area of said surface with the cathode ray beam in a defocussed state and held substantially stationary, storing a second digit, of different significance from said first digid, by first bombarding a second elemental area of said source with the cathode ray beam in a defocussed state and subsequently increasing the sharpness of focus of said beam and deflecting said beam.

References Cited in the file of this patent

UNITED STATES PATENTS

| | | |
|---|---|---|
| 2,034,704 | Nakashima et al. | Mar. 24, 1936 |
| 2,461,667 | Sunstein | Feb. 15, 1949 |
| 2,642,550 | Williams | June 16, 1953 |
| 2,671,607 | Williams et al. | Mar. 9, 1954 |